(12) United States Patent
Huang et al.

(10) Patent No.: US 11,971,622 B2
(45) Date of Patent: Apr. 30, 2024

(54) DISPLAY DEVICE

(71) Applicant: Huizhou China Star Optoelectronics Display Co., Ltd., Guangdong (CN)

(72) Inventors: Dongchen Huang, Guangdong (CN); Yuexia Lin, Guangdong (CN); Yinghui Wu, Guangdong (CN)

(73) Assignee: Huizhou China Star Optoelectronics Display Co., Ltd., Huizhou (CN)

( * ) Notice: Subject to any disclaimer, the term of this patent is extended or adjusted under 35 U.S.C. 154(b) by 0 days.

(21) Appl. No.: 17/600,317

(22) PCT Filed: Aug. 26, 2021

(86) PCT No.: PCT/CN2021/114639
§ 371 (c)(1),
(2) Date: Sep. 30, 2021

(87) PCT Pub. No.: WO2023/019621
PCT Pub. Date: Feb. 23, 2023

(65) Prior Publication Data
US 2024/0019729 A1  Jan. 18, 2024

(30) Foreign Application Priority Data

Aug. 19, 2021  (CN) .......................... 202110955260.4

(51) Int. Cl.
| | | |
|---|---|---|
| G02F 1/1335 | (2006.01) | |
| G02F 1/13357 | (2006.01) | |
| G09G 3/34 | (2006.01) | |
| H04N 23/57 | (2023.01) | |
| H04N 23/60 | (2023.01) | |

(52) U.S. Cl.
CPC .. *G02F 1/133504* (2013.01); *G02F 1/133603* (2013.01); *G09G 3/3406* (2013.01); *H04N 23/57* (2023.01); *H04N 23/60* (2023.01); *G09G 2310/0237* (2013.01)

(58) Field of Classification Search
None
See application file for complete search history.

(56) References Cited

U.S. PATENT DOCUMENTS

2021/0405448 A1* 12/2021 Hou .................. G02F 1/133603
2022/0368785 A1* 11/2022 Aoki ...................... H04N 23/55

FOREIGN PATENT DOCUMENTS

| CN | 108810199 | 11/2018 |
|---|---|---|
| CN | 109541849 | 3/2019 |
| CN | 110187559 | 8/2019 |
| CN | 110456544 | 11/2019 |
| CN | 110471211 | 11/2019 |
| CN | 110488524 | 11/2019 |
| CN | 110504289 | 11/2019 |
| CN | 110646984 | 1/2020 |

(Continued)

*Primary Examiner* — Phu Vu (57) ABSTRACT

A display device is provided. The display device includes a first display area and a second display area. The display device includes: a lamp panel, a diffusion plate, a camera, an optical film group, a light control panel, and a shading layer. A first light source of the lamp panel surrounds the camera. A first reflecting layer surrounding the camera is attached to an outer surface of the camera, so that the first display area simultaneously has a picture display function and an image pickup function.

20 Claims, 5 Drawing Sheets

(56) References Cited

FOREIGN PATENT DOCUMENTS

| | | |
|---|---|---|
| CN | 110646985 | 1/2020 |
| CN | 110658582 | 1/2020 |
| CN | 110780485 | 2/2020 |
| CN | 110865489 | 3/2020 |
| CN | 110995969 | 4/2020 |
| CN | 210327649 | 4/2020 |
| CN | 111243534 | 6/2020 |
| CN | 111638606 | 9/2020 |
| CN | 111752039 | 10/2020 |
| CN | 111965873 | 11/2020 |
| CN | 111983837 | 11/2020 |
| CN | 113031345 | 6/2021 |
| WO | WO 2020/145444 | 7/2020 |

* cited by examiner

FIG. 6

DISPLAY DEVICE

RELATED APPLICATIONS

This application is a National Phase of PCT Patent Application No. PCT/CN2021/114639 having International filing date of Aug. 26, 2021, which claims the benefit of priority of Chinese Patent Application No. 202110955260.4 filed on Aug. 19, 2021. The contents of the above applications are all incorporated by reference as if fully set forth herein in their entirety.

FIELD AND BACKGROUND OF THE INVENTION

The present invention relates to display technologies, and more particularly, to a display device.

A conventional in-screen camera adopts a design of a blind hole or a via hole. A display screen corresponding to the camera cannot carry out normal display, so that a display effect of a full screen cannot be achieved.

As full screen, narrow bezel, and high resolution are demanded currently, a demand for an in-screen camera for a full screen is increasingly obvious. Therefore, it is necessary to design a display device suitable for full screen display. When a camera is turned off, a display area displays normally. When the camera is turned on, the display area is closed, and an imaging effect of the camera is ensured.

SUMMARY OF THE INVENTION

An objective of the invention is to provide a display device for solving a technical problem that a display area corresponding to a conventional in-screen camera adopting a structure of a blind hole or a via hole cannot carry out normal display and thus a display effect of a full screen cannot be achieved.

In order to achieve the above objective, one of embodiments of the present invention provides a display device. The display device comprises a first display area and a second display area surrounding the first display area. The display device comprises a lamp panel, a diffusion plate, a camera, an optical film group, a light control panel, and a shading layer. The lamp panel comprises a substrate, and a first light source and a second light source located on the substrate. The first light source is distributed in the first display area, and the second light source is distributed in the second display area. The diffusion plate is disposed on the lamp panel and distributed in the second display area. The diffusion plate comprises a first via hole at a position corresponding to the first display area. The camera is disposed on the substrate and located in the first display area, and corresponds to the first via hole. The optical film group is disposed on the diffusion plate and distributed in the second display area. The optical film group comprises a second via hole at a position corresponding to the first display area. Edges of the second via hole and the first via hole are flush. The light control panel is disposed in the second via hole and is surrounded by a shading layer. The shading layer is disposed on inner side walls of the first via hole and the second via hole and surrounds the light control panel. The first light source surrounds the camera. A first reflecting layer surrounding the camera is attached to an outer surface of the camera.

In the display device in one of the embodiments of this application, the display device further comprises a backlight driving chip. The light control panel, the first light source, and the camera are all connected to the backlight driving chip. The backlight driving chip is configured to comprise a scattering state and a light taking state. In the scattering state, the backlight driving chip is configured to control the first light source to emit light, control the camera to be turned off, and control the light control panel to be in the scattering state. In the light taking state, the backlight driving chip is configured to control the first light source to be turned off, control the camera to be turned on, and control the light control panel to be in a transparent state.

In the display device in one of the embodiments of this application, the camera is in a shape of a truncated cone, a top of the camera is a lens, and a bottom of the camera is connected with the substrate. The substrate comprises a groove at a position corresponding to the camera. The camera and the first light source are both disposed in the groove.

In the display device in one of the embodiments of this application, a second reflecting layer is further disposed on an inner side wall of the groove.

In the display device in one of the embodiments of this application, the optical film group comprises a diffusion sheet, a lower brightness enhancement film, and a lower brightness enhancement film. The diffusion sheet is disposed on the diffusion plate. The lower brightness enhancement film is disposed on the diffusion sheet. The upper brightness enhancement film is disposed on the lower brightness enhancement film.

In the display device in one of the embodiments of this application, the first light source and the second light source comprise light-emitting diode (LED) lamp beads or micro-LED lamp beads.

In the display device in one of the embodiments of this application, the display device further comprises a display panel. The display panel is disposed on a backlight module. The display panel comprises an array substrate, a liquid crystal layer, and a color film substrate sequentially stacked from bottom to top. The color film substrate comprises a color film layer. The color film layer comprises a black matrix layer. The black matrix layer comprises a plurality of pixel openings filled with color resists. The pixel openings are not fully filled with the color resists corresponding to the first display area, and gaps are reserved between the color resists and the pixel openings for transmitting backlight.

In the display device in one of the embodiments of this application, the display device further comprises a display driving chip. The liquid crystal layer and the backlight driving chip are both connected to the display driving chip. The display driving chip is configured to comprise a display state and an image pickup state. In the display state, the display driving chip is configured to control the backlight driving chip to be in the scattering state, and control the liquid crystal layer to display a picture. In the image pickup state, the display driving chip is configured to control the backlight driving chip to be in the light taking state, and control the liquid crystal layer corresponding to the first display area to be in a transparent state.

In the display device in one of the embodiments of this application, the display panel further comprises a frame glue. The frame glue is disposed in the liquid crystal layer and corresponds to the shading layer. The liquid crystal layer comprises a first sub-liquid crystal layer surrounded by the frame glue at a position corresponding to the first display area. The liquid crystal layer comprises a second sub-liquid crystal layer at a position corresponding to the second display area. The first sub-liquid crystal layer and the second sub-liquid crystal layer are independently controlled by the display driving chip.

In the display device in one of the embodiments of this application, a method for controlling the liquid crystal layer corresponding to the first display area to be in a transparent state by the display driving chip comprises controlling all pixels corresponding to the first display area to display a maximum gray scale value.

The display device of the present invention has the beneficial effects as follows. The first reflecting layer is disposed on the outer surface of the camera, the camera is disposed in the first display area of the backlight module, and the light control panel is disposed above the camera. When the first display area is configured to display a picture, the backlight driving chip controls the first light source surrounding the camera to emit light, the camera is turned off, the light control panel is in the scattering state, and the first reflecting layer reflects the light emitted by the first light source to the light control panel and then transmits the scattered light to the display panel above. When the first display area is configured for image pickup, the backlight driving chip controls the first light source to be turned off, the camera is turned on, and the light control panel is in the transparent state to transmit external light, so that the first display area with the camera simultaneously has a picture display function and an image pickup function.

Reference numerals are as follows:
black matrix layer 1, color resist 2, pixel opening 3,
light transmission gap 4, backlight module 10, lamp panel 11,
diffusion plate 12, optical film group 13, shading layer 14,
light control panel 15, first reflecting layer 16, second reflecting layer 17,
camera 18, display panel 20, array substrate 21,
liquid crystal layer 22, color film substrate 23, frame glue 24,
first via hole 41, second via hole 42, display device 100,
first display area 110, first light source 111, second light source 112,
groove 113, second display area 120, diffusion sheet 131,
lower brightness enhancement film 132, upper brightness enhancement film 133, first sub-liquid crystal layer 221,
second sub-liquid crystal layer 222, sub-pixels R, G, B.

DESCRIPTION OF SPECIFIC EMBODIMENTS OF THE INVENTION

Technical solutions in the embodiments of this application are clearly and completely described below with reference to the accompanying drawings in the embodiments of this application. Apparently, the described embodiments are merely some embodiments rather than all the embodiments of this application. All other embodiments obtained by a person skilled in the art based on the embodiments of this application without creative efforts shall fall within the protection scope of this application.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection, an electrical connection, or mutual communication; or the connection may be a direct connection or an indirect connection through an intermediary; or may be an internal communication between two components, or may be an interactive relationship between two components. A person of ordinary skill in the art may understand the specific meanings of the foregoing terms in this application according to specific situations.

In this application, unless otherwise explicitly specified and defined, a first feature being "over" or "below" a second feature may mean that the first feature and the second feature are in direct contact, or the first feature and the second feature are not in direct contact but are in contact through another feature therebetween. In addition, the first feature being "over", "above", and "on" the second feature includes that the first feature is directly above or obliquely above the second feature, or merely means that the first feature has a larger horizontal height than the second feature. That the first feature being "below", "under", and "underneath" the second feature includes that the first feature is right below the second feature and at an inclined bottom of the second feature, or merely indicates that a horizontal height of the first feature is lower than that of the second feature.

Specifically, referring to FIG. 1 to FIG. 5, an embodiment of this application provides a display device 100. The display device 100 may be an electronic device such as a smart phone, a tablet computer, or a display screen. The display device 100 includes a backlight module 10 and a display panel 20. The display panel 20 is disposed on the backlight module 10. The display panel 20 includes an array substrate 21, a liquid crystal layer 22, and a color film substrate 23 sequentially stacked from bottom to top.

Figure 1:
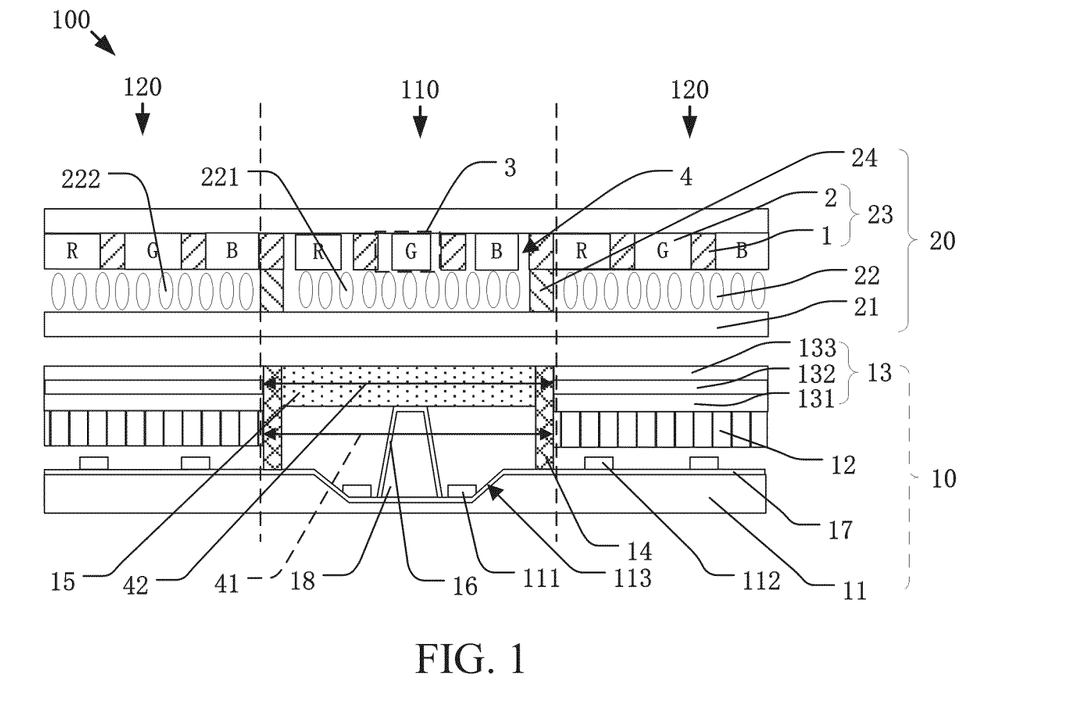
FIG. 1 is a schematic structure view of a display device according to an embodiment of this application.
Figure 2:
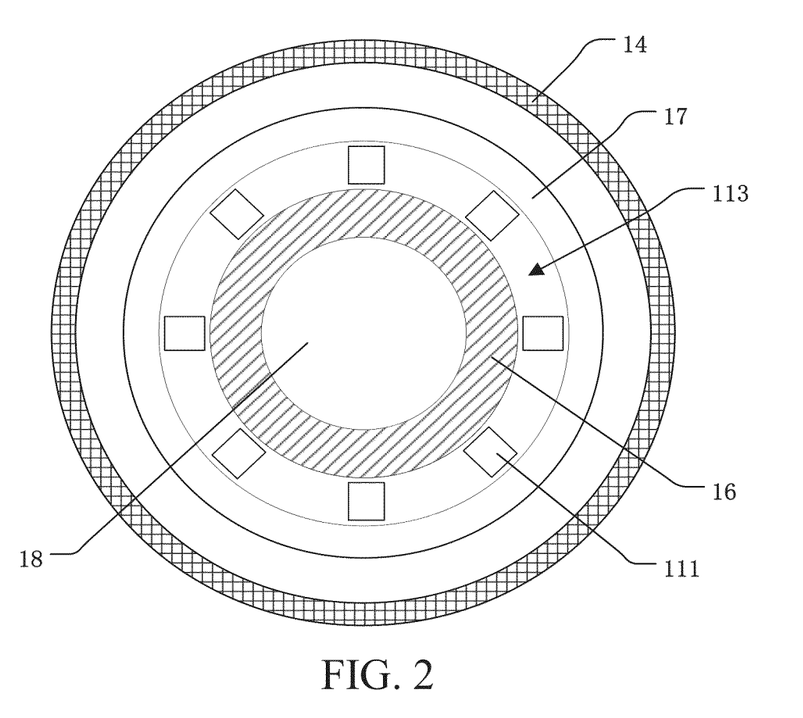
FIG. 2 is a top view of a groove position of a lamp panel according to an embodiment of this application.

Referring to FIG. 1 and FIG. 2, the display device 100 includes a first display area 110 and a second display area 120. The second display area 120 surrounds the first display area 110. The display device 100 includes a camera 18, a lamp panel 11, a diffusion plate 12, an optical film group 13, a shading layer 14, and a light control panel 15. The lamp panel 11 includes a substrate, and a first light source 111 and a second light source 112 located on the substrate. The first light source 111 is distributed in the first display area 110, and the second light source 112 is distributed in the second display area 120. The diffusion plate 12 is disposed on the lamp panel 11 and distributed in the second display area 120. The diffusion plate 12 includes a first via hole 41 at a position corresponding to the first display area 110. The optical film group 13 is disposed on the diffusion plate 12 and distributed in the second display area 120. The optical film group 13 includes a second via hole 42 at a position corresponding to the first display area 110. Edges of the second via hole 42 and the first via hole 41 are flush. The light control panel 15 is disposed in the second via hole 42. The shading layer 14 is disposed on inner side walls of the first via hole 41 and the second via hole and surrounds the light control panel 15. The camera 18 is disposed on the substrate and located in the first display area 110, and corresponds to the first via hole 41. The first light source 111 surrounds the camera 18. A first reflecting layer 16 surrounding the camera 18 is attached to an outer surface of the camera 18. The first reflecting layer 16 is configured to reflect light emitted by the first light source 111.

Figure 6:
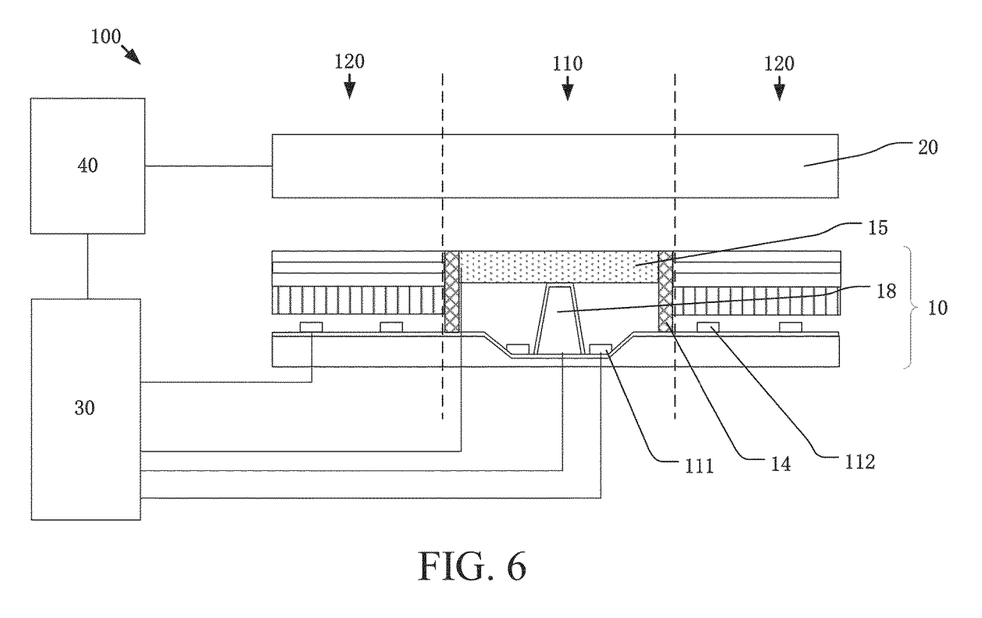
FIG. 6 is a schematic block diagram of element connection of a display device according to an embodiment of this application.

In the present embodiment, a material of the light control panel 15 includes a polymer scattering type liquid crystal or a polymer network type liquid crystal. Referring to FIG. 6, the display device 100 further includes a backlight driving chip 30. The light control panel 15, the first light source 111, and the camera 18 are all connected to the backlight driving chip 30. Specifically, the second light source 112 is also connected to the backlight driving chip 30. The backlight driving chip 30 is configured to include a scattering state and a light taking state. In the scattering state, the backlight driving chip 30 is configured to control the first light source 111 to emit light, control the camera 18 to be turned off, and control the light control panel 15 to be in the scattering state (also referred to as being fogged). The first display area 110 of the backlight module 10 is configured to provide backlight for display at this moment for display of the first display area 110 of the display panel 20. In the light taking state, the backlight driving chip 30 is configured to control the first light source 111 to be turned off, control the camera 18 to be turned on, and control the light control panel 15 to be in a transparent state. External ambient light is facilitated to enter the camera for image pickup. Specifically, in the scattering state or the light taking state, the backlight driving chip 30 drives the second light source 112 to emit light for display of the second display area 120 of the display panel 20.

Since a polymer is added in a liquid crystal of the light control panel 15 and refractive indexes of the polymer and the liquid crystal are different, a rotation direction of the liquid crystal is controlled by a voltage, so that light is allowed to be transmitted or scattered, and therefore a transparent state or a fog state can be realized. Light may be transmitted in the transparent state, and light may be scattered in the fog state so as to be used for displaying a picture.

A specific process of using the light control panel 15 is as follows. The liquid crystal and the polymer have the same anisotropic dielectric constant. When no voltage is applied or the voltage is lower than a threshold voltage, liquid crystal molecules are arranged irregularly, so that light is scattered. When the applied voltage is higher than the threshold voltage, the liquid crystal molecules rotate and are orderly arranged along a direction of an electric field, so that an anisotropic property of the dielectric constant of the liquid crystal is changed. Therefore, a light passing path is generated in the liquid crystal, and the light is not scattered.

In the present embodiment, the camera 18 is in the shape of a truncated cone, a top of the camera is a lens, and a bottom of the camera is connected with the substrate. The substrate includes a groove 113 at a position corresponding to the camera 18. The camera 18 and the first light source 111 are both disposed in the groove 113. The first reflecting layer 16 is preferably disposed on a truncated cone-shaped side wall to effectively reflect light emitted by the first light source 111 into the display panel 20.

In the present embodiment, a second reflecting layer 17 is further disposed on an inner side wall of the groove 113. The first light source 111 and the second light source 112 are both disposed on the second reflecting layer 17. The second reflecting layer 17 is configured to reflect light emitted by the first light source 111 and the second light source 112 to transmit the light upwards.

In the present embodiment, the optical film group 13 includes a diffusion sheet 131, a lower brightness enhancement film 132, and a lower brightness enhancement film 133. The diffusion sheet 131 is disposed on the diffusion plate 12. The lower brightness enhancement film 132 is disposed on the diffusion sheet 131. The upper brightness enhancement film 133 is disposed on the lower brightness enhancement film 132. The optical film group 13 is configured to enhance the brightness and uniformity of light. The diffusion sheet 131 can enhance the uniformity of light. The lower brightness enhancement film 132 and the upper brightness enhancement film 133 are configured to enhance the brightness of light.

In the present embodiment, the first light source 111 and the second light source 112 include LED lamp beads or micro-LED lamp beads.

Figure 3:
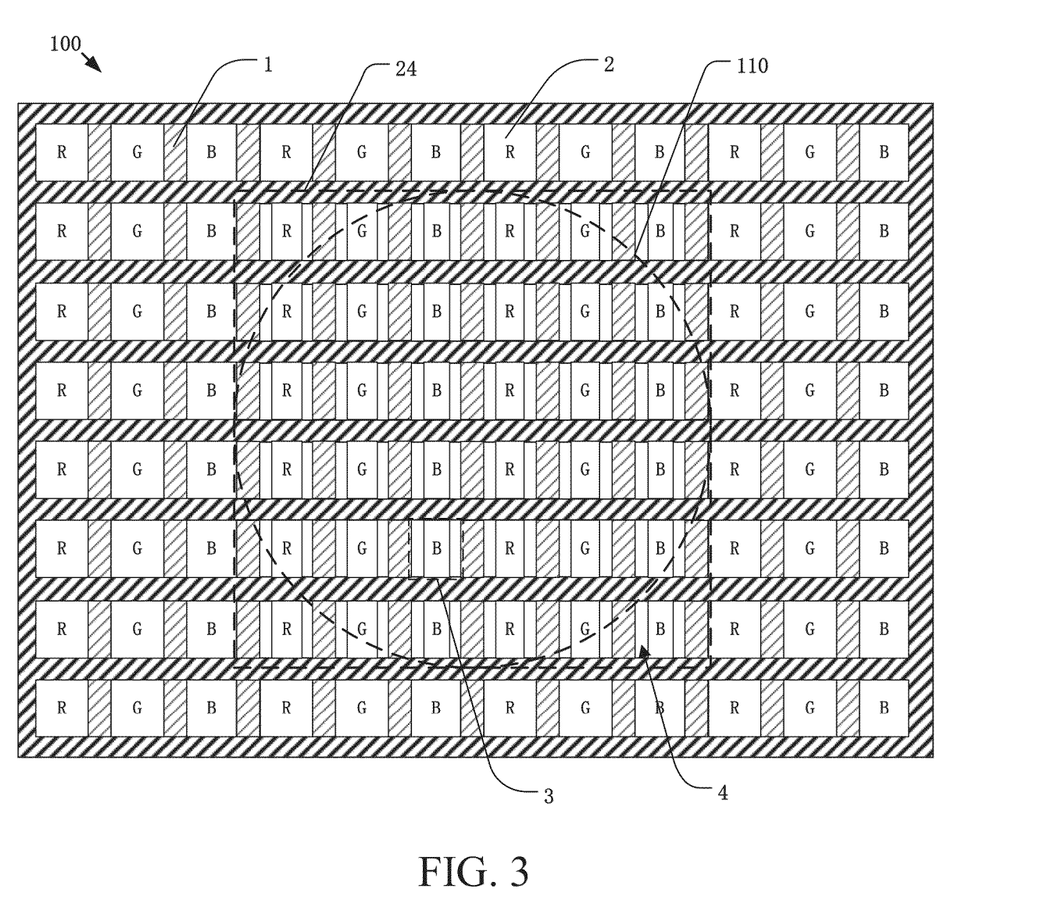
FIG. 3 is a partially enlarged view of a top view structure of a color film layer of a color film substrate according to an embodiment of this application.
Figure 4:
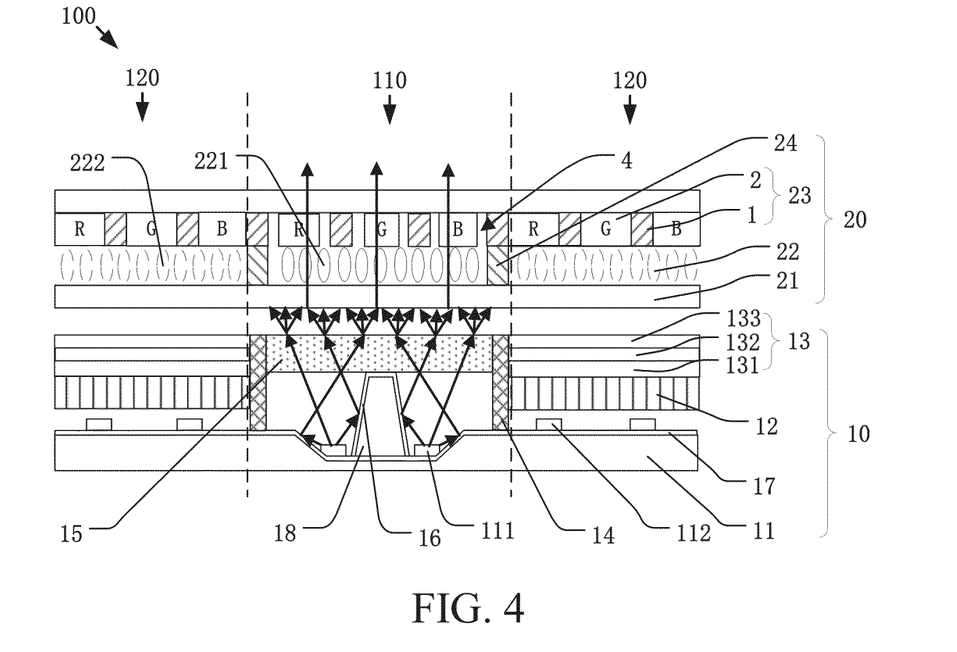
FIG. 4 is a schematic structure view of a first display area of a display device for picture display according to an embodiment of this application.
Figure 5:
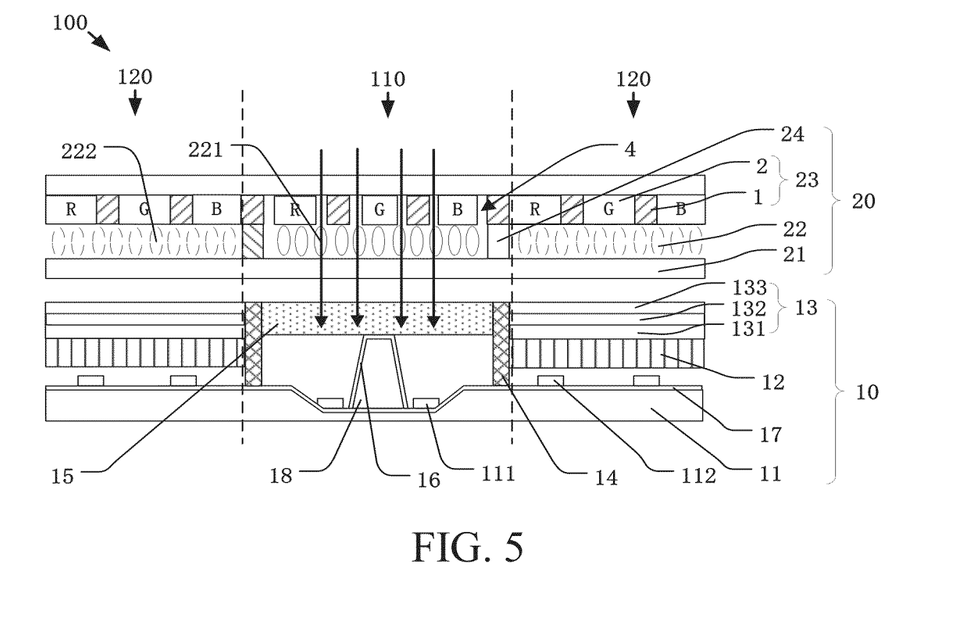
FIG. 5 is a schematic structure view of a first display area of a display device for image pickup according to an embodiment of this application.

In the present embodiment, the color film substrate 23 includes a color film layer. The color film layer includes a black matrix layer 1. The black matrix layer 1 includes a plurality of pixel openings 3. The plurality of pixel openings 3 is filled with color resists 2. The pixel openings 3 are not fully filled with the color resists 2 corresponding to the first display area 110, and gaps 4 are reserved between the color resists 2 and the pixel openings 3 for transmitting backlight. The color resist 2 includes a plurality of sub-pixels. An area of the sub-pixels in the first display area 110 is smaller than an area of the sub-pixels in the second display area 120. The plurality of sub-pixels includes red sub-pixels R, green sub-pixels G, and blue sub-pixels B.

A material of the liquid crystal layer 22 includes a thermotropic liquid crystal or a lyotropic liquid crystal. A material of the liquid crystal includes a biphenyl liquid crystal, a phenylcyclohexane liquid crystal, or an ester liquid crystal. Referring to FIG. 6, the light control panel 15, the display panel 20, the first light source 111, the second light source 112, and the camera 18 are all connected to the display driving chip 40. Specifically, the light control panel 15, the first light source 111, the second light source 112, and the camera 18 are all connected to the backlight driving chip 30. The backlight driving chip 30 and the display panel 20 are connected to the display driving chip 40. The display driving chip 40 is configured to include a display state and an image pickup state. In the display state, the display driving chip 40 is configured to control the backlight driving chip 30 to be in the scattering state, and control the display panel 20 to display a picture. In the image pickup state, the display driving chip 40 is configured to control the backlight driving chip 30 to be in the light taking state, and control the liquid crystal layer 22 corresponding to the first display area 110 to be in a transparent state. Specifically, when the first display area 110 and the second display area 120 are configured to display pictures, the first light source 111 and the second light source 112 emit light, the camera 18 is turned off, and the light control panel 15 is in the scattering state so that light emitted by the first light source 111 is scattered and then transmitted to the display panel 20. The display panel 20 presents gray scales with different degrees according to pixel data and voltages of pixel electrodes so that light emitted by the first light source 111 and the second light source 112 presents different brightness after passing through the sub-pixels. When the camera 18 is required for image pickup, the backlight driving chip 30 controls the camera 18 to be turned on, the light control panel 15 is in a transparent state, and the display driving chip 40 controls the liquid crystal layer 22 in the first display area 110 to be in the transparent state so as to transmit external light.

Specifically, a method for controlling the liquid crystal layer 22 corresponding to the first display area 110 to be in the transparent state by the display driving chip 40 includes controlling all sub-pixels corresponding to the first display area 110 in the display panel 20 to display a maximum gray scale value.

In the present embodiment, the display panel 20 further includes a frame glue 24. The frame glue 24 is disposed in the liquid crystal layer 22 and corresponds to the shading layer 14. The liquid crystal layer 22 includes a first sub-liquid crystal layer 221 surrounded by the frame glue 24 at a position corresponding to the first display area 110. The liquid crystal layer 22 includes a second sub-liquid crystal layer 222 at a position corresponding to the second display area 120. The first sub-liquid crystal layer 221 and the second sub-liquid crystal layer 222 are independently controlled by the display driving chip 40.

The display driving chip 40 realizes switching control of the liquid crystal layer 22 by controlling a voltage input into a sub-pixel electrode.

In the present embodiment, the black matrix layer 1 and the color resist 2 are disposed on the same layer. The black matrix layer 1 includes a pixel opening 3. The color resist 2 is disposed in the pixel opening 3 to form a sub-pixel. A light transmission gap 4 is reserved between the sub-pixel in the first display area 110 and the pixel opening 3. It will be appreciated that the sub-pixel in the second display area 120 completely fills the pixel opening 3, there is no light transmission gap 4 between the sub-pixel in the second display area 120 and the pixel opening 3, and the light transmission gap 4 reserved in the first display area 110 is effective to transmit external light into the lens at the top of the camera 18.

The present invention has the beneficial effects as follows. The display device is provided. The first reflecting layer is disposed on the outer surface of the camera, the camera is disposed in the first display area of the backlight module, and the light control panel is disposed above the camera. When the first display area is configured to display a picture, the backlight driving chip controls the first light source surrounding the camera to emit light, the camera is turned off, the light control panel is in the scattering state, and the first reflecting layer reflects the light emitted by the first light source to the light control panel and then transmits the scattered light to the display panel above. When the first display area is configured for image pickup, the backlight driving chip controls the first light source to be turned off, the camera is turned on, and the light control panel is in the transparent state to transmit external light, so that the first display area with the camera simultaneously has a picture display function and an image pickup function.

The display device provided in the embodiments of this application is described in detail above. Although the principles and implementations of this application are described by using specific examples in this specification, the descriptions of the foregoing embodiments are merely intended to help understand the method and the core idea of the method of this application. A person of ordinary skill in the art should understand that modifications may be still made to the technical solutions described in the foregoing embodiments or equivalent replacements may be made to some technical features thereof, as long as such modifications or replacements do not make the essence of corresponding technical solutions depart from the scope of the technical solutions of the embodiments of this application.

What is claimed is:

1. A display device, defining a first display area and a second display area surrounding the first display area, wherein the display device comprises:
    a lamp panel comprising a substrate, and a first light source and a second light source located on the substrate, wherein the first light source is distributed in the first display area, and the second light source is distributed in the second display area;
    a diffusion plate disposed on the lamp panel and distributed in the second display area, wherein the diffusion plate defines a first via hole at a position corresponding to the first display area;
    a camera disposed on the substrate, located in the first display area, and corresponding to the first via hole;
    an optical film group disposed on the diffusion plate and distributed in the second display area, wherein the optical film group defines a second via hole at a position corresponding to the first display area, and edges of the second via hole and the first via hole are aligned;
    a light control panel disposed in the second via hole; and
    a shading layer disposed on inner side walls of the first via hole and the second via hole and surrounding the light control panel,
    wherein the first light source surrounds the camera, and an outer surface of the camera is provided with a first reflecting layer surrounding the camera.

2. The display device according to claim 1, further comprising: a backlight driving chip, wherein the light control panel, the first light source, and the camera are all connected to the backlight driving chip; the backlight driving chip is configured to comprise a scattering state and a light taking state; in the scattering state, the backlight driving chip is configured to control the first light source to emit light, control the camera to be turned off, and control the light control panel to be in the scattering state; and in the light taking state, the backlight driving chip is configured to control the first light source to be turned off, control the camera to be turned on, and control the light control panel to be in a transparent state.

3. The display device according to claim 2, wherein a material of the light control panel comprises a polymer scattering type liquid crystal.

4. The display device according to claim 2, wherein a material of the light control panel comprises a polymer network type liquid crystal.

5. The display device according to claim 1, wherein the camera is in a shape of a truncated cone, a top of the camera is a lens, and a bottom of the camera is connected with the substrate.

6. The display device according to claim 5, wherein the substrate comprises a groove at a position corresponding to the camera, and the camera and the first light source are both disposed in the groove.

7. The display device according to claim 6, wherein a second reflecting layer is further disposed on an inner side wall of the groove.

8. The display device according to claim 1, wherein the optical film group comprises:
    a diffusion sheet, disposed on the diffusion plate;
    a lower brightness enhancement film, disposed on the diffusion sheet; and
    an upper brightness enhancement film, disposed on the lower brightness enhancement film.

9. The display device according to claim 1, wherein the first light source comprises light-emitting diode (LED) lamp beads or micro-LED lamp beads.

10. The display device according to claim 1, wherein the second light source comprises light-emitting diode (LED) lamp beads or micro-LED lamp beads.

11. The display device according to claim 1, further comprising: a display panel on a backlight module.

12. The display device according to claim 11, wherein the display panel comprises an array substrate, a liquid crystal layer, and a color film substrate sequentially stacked from bottom to top; the color film substrate comprises a color film layer; the color film layer comprises a black matrix layer; the black matrix layer comprises a plurality of pixel openings filled with color resists; and the pixel openings are not fully filled with the color resists corresponding to the first display area, and gaps are reserved between the color resists and the pixel openings for transmitting backlight.

13. The display device according to claim 12, wherein the color resist comprises a plurality of sub-pixels, an area of the sub-pixels in the first display area being smaller than an area of the sub-pixels in the second display area.

14. The display device according to claim 12, further comprising: a display driving chip, wherein the liquid crystal layer and the backlight driving chip are both connected to the display driving chip.

15. The display device according to claim 14, wherein the display driving chip is configured to comprise a display state and an image pickup state; in the display state, the display driving chip is configured to control the backlight driving chip to be in the scattering state, and control the liquid crystal layer to display a picture; and in the image pickup state, the display driving chip is configured to control the backlight driving chip to be in the light taking state, and control the liquid crystal layer corresponding to the first display area to be in a transparent state.

16. The display device according to claim 15, wherein the display panel further comprises:
a frame glue, disposed in the liquid crystal layer and corresponding to the shading layer.

17. The display device according to claim 16, wherein the liquid crystal layer comprises a first sub-liquid crystal layer surrounded by the frame glue at a position corresponding to the first display area, and the liquid crystal layer comprises a second sub-liquid crystal layer at a position corresponding to the second display area, the first sub-liquid crystal layer and the second sub-liquid crystal layer being independently controlled by the display driving chip.

18. The display device according to claim 14, wherein a method for controlling the liquid crystal layer corresponding to the first display area to be in a transparent state by the display driving chip comprises controlling all pixels corresponding to the first display area to display a maximum gray scale value.

19. The display device according to claim 18, wherein the display driving chip realizes switching control of the liquid crystal layer by controlling a voltage input into a sub-pixel electrode.

20. The display device according to claim 12, wherein a material of the liquid crystal layer comprises a thermotropic liquid crystal or a lyotropic liquid crystal, and a material of the liquid crystal comprises a biphenyl liquid crystal, a phenylcyclohexane liquid crystal, or an ester liquid crystal.

* * * * *